(12) United States Patent
Cho et al.

(10) Patent No.: US 12,392,546 B2
(45) Date of Patent: Aug. 19, 2025

(54) REFRIGERATOR AND METHOD FOR CONTROLLING SAME

(71) Applicant: Samsung Electronics Co., Ltd., Suwon-si (KR)

(72) Inventors: Sungho Cho, Suwon-si (KR); Miyoung Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 584 days.

(21) Appl. No.: 17/874,904

(22) Filed: Jul. 27, 2022

(65) Prior Publication Data

US 2022/0364786 A1    Nov. 17, 2022

Related U.S. Application Data

(63) Continuation of application No. PCT/KR2021/000552, filed on Jan. 14, 2021.

(30) Foreign Application Priority Data

Feb. 13, 2020 (KR) .......................... 10-2020-0017483

(51) Int. Cl.
  *F25D 29/00* (2006.01)
  *G06Q 30/0601* (2023.01)
  *H04N 7/18* (2006.01)

(52) U.S. Cl.
  CPC ....... *F25D 29/005* (2013.01); *G06Q 30/0631* (2013.01); *H04N 7/188* (2013.01);
  (Continued)

(58) Field of Classification Search
  CPC ...... F25D 29/005; F25D 23/12; F25D 23/028; F25D 2700/06; F25D 2400/361;
  (Continued)

(56) References Cited

U.S. PATENT DOCUMENTS 5,887,176 A * 3/1999 Griffith .............. G06K 19/0705
                                                        340/10.33
9,719,720 B2 * 8/2017 Seo .......................... F25D 29/00
(Continued)

FOREIGN PATENT DOCUMENTS

JP        6242537 B2    12/2017
JP     2021-124249 A     8/2021
(Continued)

*Primary Examiner* — Jacques M Saint Surin
(74) *Attorney, Agent, or Firm* — Jefferson IP Law, LLP

(57) ABSTRACT

A refrigerator is provided. The refrigerator includes a body comprising a first storage compartment, a door coupled to the body so as to open/close the first storage compartment and provided with a second storage compartment other than the first storage compartment, a weight sensing unit capable of being disposed in at least one of the first and second storage compartments so as to sense the weight of an item stored in the at least one of the first and second storage compartments, a communication unit for communicating with the weight sensing unit, and a control unit for generating, on the basis of the state of a communication connection between the weight sensing unit and communication unit, an output signal that distinguishes the state of the communication connection.

13 Claims, 11 Drawing Sheets

(52) U.S. Cl.
CPC .... *F25D 2400/361* (2013.01); *F25D 2500/06* (2013.01); *F25D 2600/06* (2013.01); *F25D 2700/06* (2013.01)

(58) Field of Classification Search
CPC ............ F25D 2600/06; F25D 2500/06; G06Q 30/0631; H04N 7/188
USPC .......................................................... 177/1
See application file for complete search history.

(56) References Cited

U.S. PATENT DOCUMENTS

| | | | | |
|---|---|---|---|---|
| 10,049,242 | B2* | 8/2018 | Oono | .................. H04L 12/4625 |
| 11,140,159 | B2* | 10/2021 | Wang | ...................... G06F 21/32 |
| 2015/0294451 | A1 | 10/2015 | Lee et al. | |
| 2018/0334846 | A1* | 11/2018 | Eom | ....................... E05F 15/73 |

FOREIGN PATENT DOCUMENTS

| | | |
|---|---|---|
| KR | 10-0499021 B1 | 7/2005 |
| KR | 10-0673435 B1 | 1/2007 |
| KR | 10-2008-0096620 A | 10/2008 |
| KR | 10-2012-0123978 A | 11/2012 |
| KR | 10-2014-0127590 A | 11/2014 |
| KR | 10-2015-0054303 A | 5/2015 |
| KR | 10-2015-0140554 A | 12/2015 |
| KR | 10-1635570 B1 | 7/2016 |
| KR | 10-2017-0093640 A | 8/2017 |
| KR | 10-2017-0112298 A | 10/2017 |
| KR | 10-2017-0115699 A | 10/2017 |
| KR | 10-1830660 B1 | 2/2018 |
| KR | 10-2018-0025041 A | 3/2018 |
| KR | 10-2018-0081961 A | 7/2018 |
| KR | 10-1946367 B1 | 2/2019 |
| KR | 10-2019-0023981 A | 3/2019 |
| KR | 10-2019-0070700 A | 6/2019 |
| KR | 10-2020-0056250 A | 5/2020 |

* cited by examiner

REFRIGERATOR AND METHOD FOR CONTROLLING SAME

CROSS-REFERENCE TO RELATED APPLICATION(S)

This application is a continuation application, claiming priority under § 365(c), of an International application No. PCT/KR2021/000552, filed on Jan. 14, 2021, which is based on and claims the benefit of a Korean patent application number 10-2020-0017483, filed on Feb. 13, 2020, in the Korean Intellectual Property Office, the disclosure of which is incorporated by reference herein in its entirety.

BACKGROUND

1. Field

The disclosure relates to a refrigerator and method of controlling the same. More particularly, the disclosure relates to a technology for figuring out a remaining amount of a food in a refrigerator.

2. Description of Related Art

Refrigerators are devices for storing items such as foods, drinks, and other perishable items, for a long time to prevent the items from being spoiled, and are commonly equipped with a refrigeration chamber for refrigerating the items and a freezer chamber for freezing the items.

The user needs to check inside of the refrigerator to check remains of a food, a drink, and other perishable items, stored in the refrigerator, and may determine a remaining amount of a drink contained in a transparent container by his or her naked eye.

For drinks, in particular, contained in an opaque container or in a thick glass bottle, there is a problem that it is difficult to make accurate decision on the remaining amount of the drink.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a refrigerator coupled to a weight detector capable of accurately figuring out a remaining amount of a content, and a method of controlling the refrigerator.

Additional aspects will be set forth in part in the description which follows and, in part, will be apparent from the description, or may be learned by practice of the presented embodiments.

In accordance with an aspect of the disclosure, a refrigerator is provided. The refrigerator includes a main body including a first storeroom, a door coupled to the main body to open or close the first storeroom and equipped with a second storeroom apart from the first storeroom, a weight detector allowed to be arranged in at least one of the first storeroom or the second storeroom for detecting weight of an item stored in the at least one of the first storeroom or the second storeroom, a communication module configured to perform communication with the weight detector, and a controller configured to generate an output signal based on a connection state of the communication between the weight detector and the communication module, the output signal identifying the connection state of the communication.

The weight detector may include an indicator indicating the output signal, and the controller may control the output signal to be output through the indicator.

The controller may control the indicator to output a first mode in response to the weight detector not connected to the communication module, a second mode in response to the weight detector being connected to the communication module, and a third mode in response to the weight detector connected to the communication module.

In an embodiment, the refrigerator further includes a display arranged in at least one portion of the door for displaying a screen to select connection between the weight detector and the communication module and the output signal, and the controller may generate the output signal based on receiving a connection command from the user.

The controller may control the screen to select connection between the weight detector and the communication module to be output to a user terminal, and generate the output signal based on receiving a connection command from the user through the user terminal.

The controller may issue an identity (ID) to the weight detector in response to the weight detector connected to the communication module, and control the ID and information about an output signal corresponding to the ID to be output to the user terminal.

In accordance with another aspect of the disclosure, a refrigerator is provided. The refrigerator includes a main body including a first storeroom, a door coupled to the main body to open or close the first storeroom and equipped with a second storeroom apart from the first storeroom, a weight detector arranged in at least one of the first storeroom or the second storeroom for detecting weight of an item, and a controller configured to determine a remaining amount of content included in the item through the weight detector.

In an embodiment, the refrigerator further includes a communication module configured to perform communication with a user terminal with which to transmit or receive information about the item, and the controller may obtain weight of a container storing the content and determine a remaining amount of the content based on a final weight of the item and the weight of the container, in response to receiving the information about the item.

The controller may control the communication module to transmit information about the remaining amount of the content to the user terminal.

The controller may control the communication module to transmit a message recommending purchase of the item or a command for automatic purchase of the item to the user terminal in response to the remaining amount of the content being equal to or less than a preset amount.

The controller may control the communication module to transmit a message inducing to write information about the item to the user terminal in response to the weight detector detecting that the item is placed.

The message may include at least one of a notification message, a push message, or an in-app message.

The controller may control the communication module to transmit a command to execute a camera function for capturing an image of the item to the user terminal in response to the weight detector detecting that the item is placed.

The controller may obtain information about the item based on an image of the item captured by the user terminal, and control the communication module to transmit an ID of the weight detector and a remaining amount of the content of the item to the user terminal in response to the weight detector detecting that the item is placed.

In accordance with another aspect of the disclosure, a computer program is provided. The computer program is stored in a recording medium to perform, in conjunction with a computing device, detecting placement of an item through a weight detector arranged in a refrigerator and obtaining weight of the item, receiving information about the item from a user terminal, and obtaining weight information of a container storing a content based on the information about the item, and determining a remaining amount of the content based on a final weight of the item and the weight information of the container.

The computer program further includes generating a message recommending purchase of the item or a command for automatic purchase of the item to the user terminal in response to the remaining amount of the content being equal to or less than a preset amount.

The computer program further includes generating a message inducing to write information about the item in response to the weight detector detecting that the item is placed.

The message may include at least one of a notification message, a push message, or an in-app message.

The computer program further includes generating a command to execute a camera function for capturing the item, in response to the weight detector detecting that the item is placed.

The computer program further includes obtaining information about the item based on an image of the item captured by the user terminal, and indicating an ID of the weight detector and a remaining amount of the content of the item to the user terminal in response to the weight detector detecting that the item is placed.

According to the disclosure, the user may obtain accurate information about a remaining amount of a content in a refrigerator without checking the remaining amount of the content with his/her naked eye.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
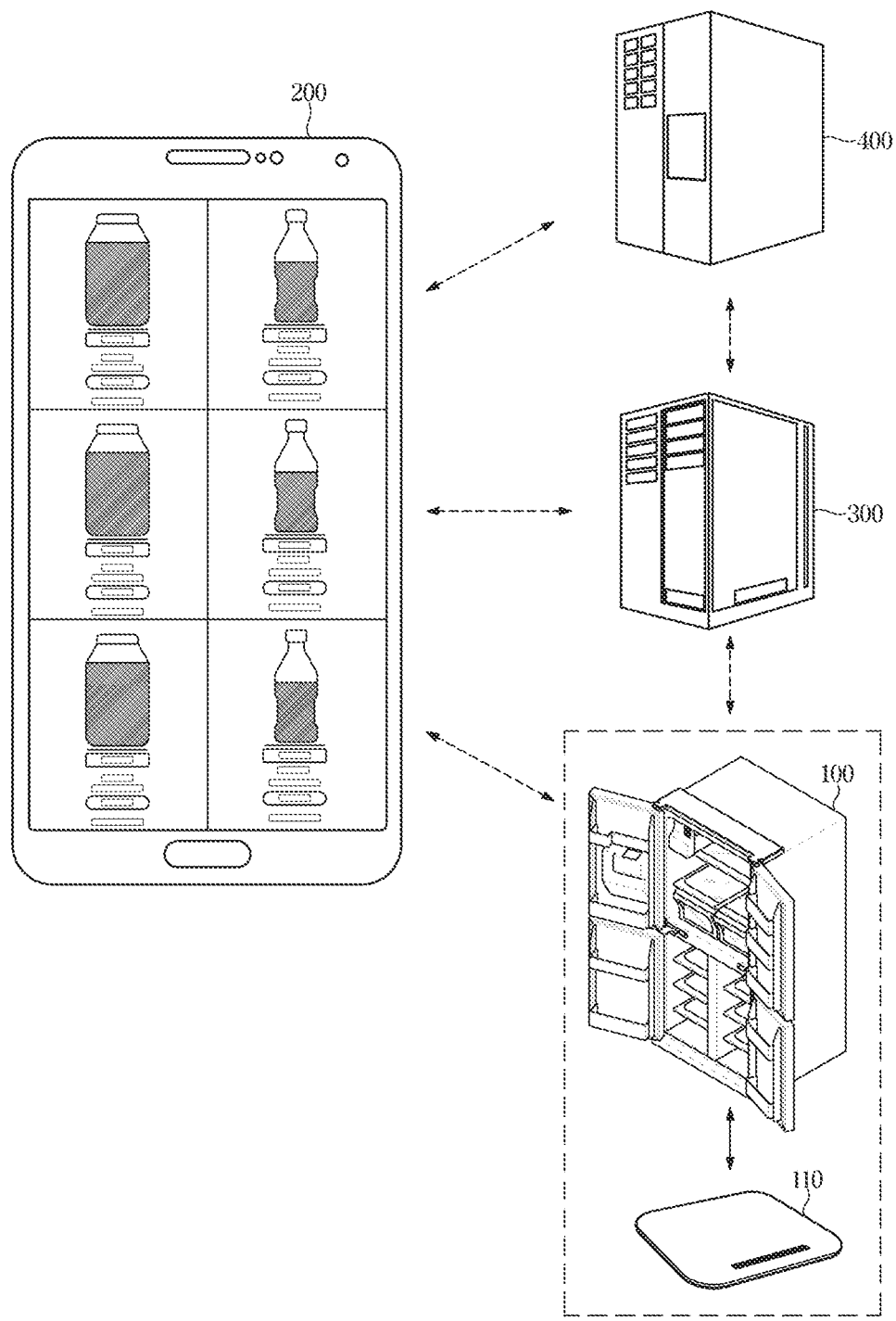
FIG. 1 illustrates a system in which a refrigerator and method of controlling the same is implemented, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term 'unit, module, member, or block' may refer to what is implemented in software or hardware, and a plurality of units, modules, members, or blocks may be integrated in one component or the unit, module, member, or block may include a plurality of components, depending on the embodiment of the disclosure.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

Several terms used in the specification will be clearly defined before describing the disclosure.

In the disclosure, an item is a concept including a content to be eaten by the user and a container that contains the content. For example, milk is stored in a refrigerator while being contained in a milk carton. In this case, the content corresponds to the milk, the milk carton corresponds to the container, and the milk and the milk carton may be collectively defined as the item.

In the disclosure, a remaining amount of a content itself may be accurately figured out by obtaining material information, volume information, weight information, etc., of the container based on information about the item and reflecting the weight information of the container in the entire weight measured by the weight detector.

Reference will now be made in detail to embodiments of the disclosure, which are illustrated in the accompanying drawings.

FIG. 1 illustrates a system in which a refrigerator and method of controlling the same is implemented, according to an embodiment of the disclosure.

Figure 2:
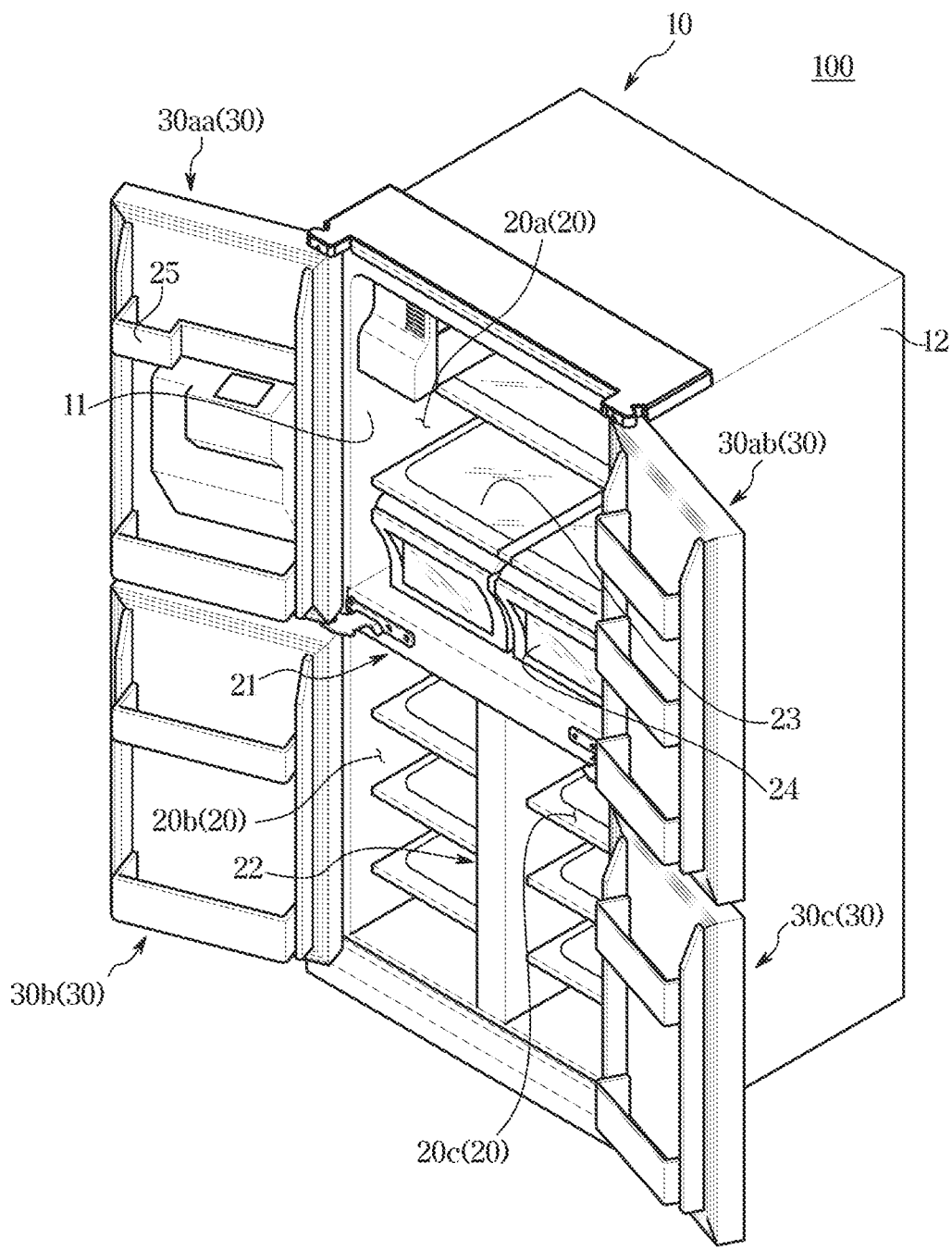
FIG. 2 illustrates a refrigerator, according to an embodiment of the disclosure.

FIG. 2 illustrates a refrigerator, according to an embodiment of the disclosure.

Figure 3:
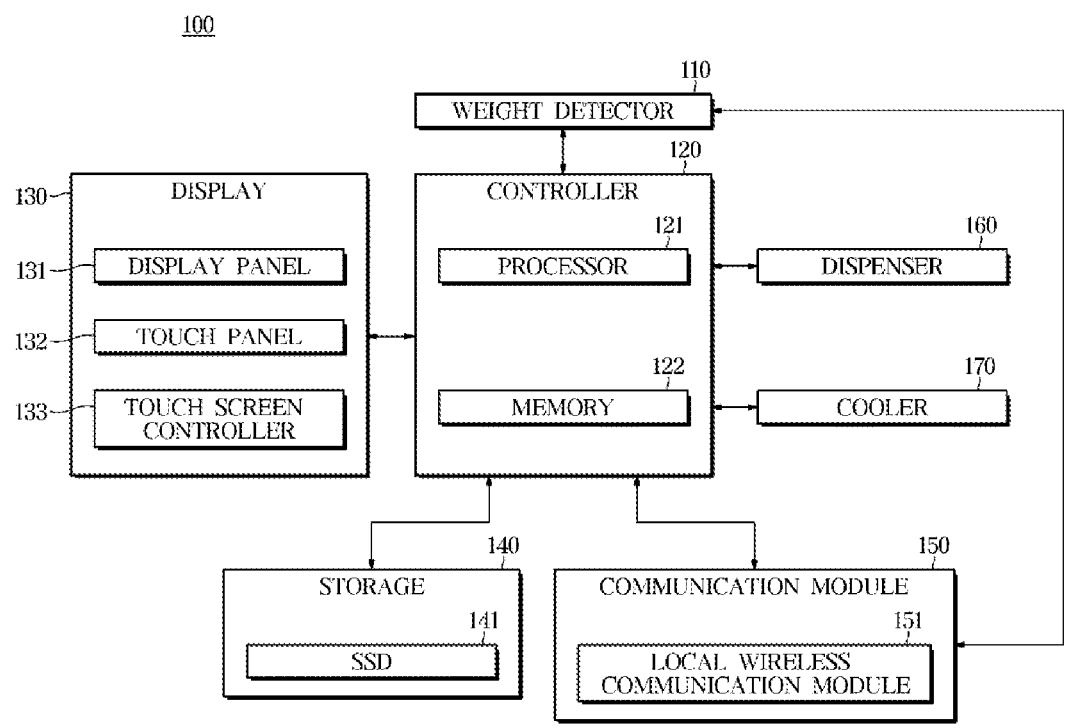
FIG. 3 is a control block diagram of a refrigerator, according to an embodiment of the disclosure.

FIG. 3 is a control block diagram of a refrigerator, according to an embodiment of the disclosure.

Figure 4:
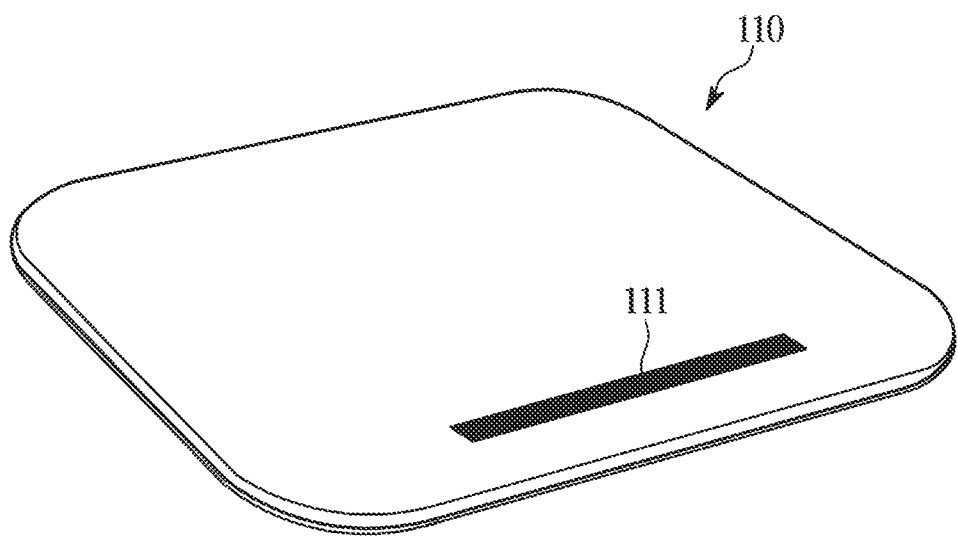
FIG. 4 illustrates a weight detector, according to an embodiment of the disclosure.

FIG. 4 illustrates a weight detector, according to an embodiment of the disclosure.

Referring to FIGS. 1 to 4, a system according to an embodiment includes a refrigerator 100, a user terminal 200 having an application installed therein to provide information about an item based on a weight detector 110, a cloud server 300 for receiving, from the refrigerator 100 and the user terminal 200, and storing the information about the item, and determining a remaining amount of a content, and an external server 400 for receiving a request for an order of an item from the user terminal 200 or the cloud server 300.

The cloud server 300 is a server connected to the refrigerator 100 and the user terminal 200 over a network, and may receive data from the refrigerator 100 and the user terminal 200 and provide a result of processing the received data. In the disclosure, an operation performed by a controller 120 may surely be performed by the cloud server 300, in which case the cloud server 300 provides in real time the process result to the user terminal 200 or a display 130. The external server 400 refers to a food vendor's server.

Although it is shown in FIG. 1 that the cloud server 300 is connected to the refrigerator 100 and the user terminal 200 to perform data processing, the disclosure may also be performed by data transmission or reception and data processing between the refrigerator 100 and the user terminal 200 not by the cloud server 300.

The refrigerator 100 may include a main body 10 with an open front, a first storeroom 20 formed in the main body 10 to refrigerate and/or freeze foods inside, and a door 30 for opening or closing the open front of the main body 10.

The main body 10 may define outer appearance of the refrigerator 100. The main body 10 may include an inner casing 11 forming the first storeroom 20 and an outer casing 12 coupled to outer sides of the inner casing 11 to form the outer appearance. Insulation (not shown) may be filled between the inner casing 11 and the outer casing 12 of the main body 10 to prevent cold air from leaking out of the first storeroom 20.

The first storeroom 20 may be divided by a horizontal partition wall 21 and a vertical partition wall 22. For example, as shown in FIG. 1, the first storeroom 20 may be divided into an upper storeroom 20a, a first lower storeroom 20b and a second lower storeroom 20c. Shelves 23 for foods to be put thereon and airtight containers 24 for air-tightly storing foods may be provided in the first storeroom 20.

The first storeroom 20 may be opened or closed by the door 30. For example, as shown in FIG. 1, the upper storeroom 20a may be opened or closed by a first upper door 30aa and a second upper door 30ab, the first lower storeroom 20b may be opened or closed by a first lower door 30b, and the second lower storeroom 20c may be opened or closed by a second lower door 30c.

A handle may be arranged on the door 30 to easily open or close the door 30. The handle may be formed to be lengthened vertically between the first upper door 30aa and the second upper door 30ab and between the first lower door 30b and the second lower door 30c. Hence, while the door 30 is closed, the handle may appear to be in one body. The door 30 may be equipped with a second storeroom 25, which is an accommodating space for storing drinks of foods stored in the refrigerator.

Referring to FIG. 2, although it is shown that the second storeroom 25 is at a particular location, the second storeroom 25 may be equipped in the first upper door 30aa, the second upper door 30ab, the first lower door 30b and the second lower door 30c.

In the refrigerator 100 of the disclosure, the weight detector 110 may be arranged in the first storeroom 20 or the second storeroom for measuring the weight of an item. In this case, the refrigerator 100 may perform wireless communication with the weight detector 110 arranged in the first storeroom 20 or the second storeroom 25 through a communication module 150 capable of performing short-range communication. For example, the communication module 150 may include a local wireless communication module 151 to perform communication with the weight detector 110 based on a communication standard such as wireless fidelity (Wi-Fi), Bluetooth™, Zigbee, etc.

Referring to FIG. 3, the refrigerator 100 may include the controller 120, the display 130, a storage 140, the communication module 150, a dispenser 160, and a cooler 170.

In this case, the weight detector 110 corresponds to a detachable device in the refrigerator 100, which may be installed by a user in the first storeroom 20 or the second storeroom 25, constituting part of the refrigerator 100 through connection with the communication module 150. The weight detector 110 may be a weight sensor for detecting the weight of an object. The weight detector 110 may measure the weight of an item when the item is placed. Furthermore, the weight detector 110 may allow an amount of change in content to be figured out by measuring the weight of the item at regular intervals.

Referring to FIG. 4, the weight detector 110 may be manufactured in a plate form to allow at least one item to be placed thereon. For example, the weight detector 110 may have width as wide as one item may be placed thereon or as wide as multiple items may be simultaneously placed thereon. In this case, the weight detector 110 may split sections to measure weights of different items separately.

The weight detector 110 may include an indicator 111 for indicating an output signal identifying a state of connection with the communication module 150. The indicator 111 may be implemented by various indication devices, including e.g., a light emitting diode (LED) device, a liquid crystal display (LCD) panel, a seven-segment display device, or the like.

The state of connection between the weight detector 110 and the communication module 150 may be classified into a non-connected state, a state of ongoing connection, and a state of complete connection. The indicator 111 may identify and output the respective connection states in various forms. For example, the weight detector 110 may output red light for the non-connected state, yellow light for the state of ongoing connection, and green light for the state of complete connection, when the indicator 111 is an LED device. This is, however, an example, and there may surely be other various methods of identifying the connection states. In this case, connection between the weight detector 110 and the communication module 150 may be made by the user's selection or automatic settings on an application installed in the user terminal 200.

The display 130 may include a display panel 131 for displaying an image, a touch panel 132 for receiving a touch input, and a touch screen controller 133 for driving or controlling the display panel 131 and the touch panel 132.

The display panel 131 may convert image data created by the controller 120 to an optical signal that may be visible to the user, through the touch screen controller 133. In this case, the image data may include information about the weight detector 110 (e.g., an ID of the weight detector and information about the connection state), and information about an item (e.g., a name of the item, a storage period of the item, expiration date of the item, and a remaining amount of the content).

The display panel 131 may employ a cathode ray tube (CRT) display panel, an LCD panel, an LED panel, an organic LED (OLED) panel, a plasma display panel (PDP), a field emission display (FED) panel, etc. The display panel 131 is not, however, limited thereto, and the display panel 131 may employ various displays capable of visually presenting an optical image corresponding to the image data.

The touch panel 132 may receive a touch input of the user on the touch panel 132 and output an electric signal corresponding to the received touch input to the touch screen controller 133.

For example, the touch panel 132 may detect a touch of the user on the touch panel 132 from a change in resistance or capacitance and output an electric signal corresponding to coordinates of a touch point of the user to the touch screen controller 133. The touch screen controller 133 may determine the coordinates of the touch point of the user based on the electric signal received from the touch panel 132.

The touch panel 132 may be located on the front side of the display panel 131. In other words, the touch panel 132 may be arranged on the surface where images are displayed. Hence, the touch panel 132 may be formed of a transparent material to prevent distortion of the image displayed on the display panel 131.

The touch panel 132 may employ a resistive touch panel or a capacitive touch panel. The touch panel 132 is not, however, limited thereto, and the touch panel 132 may employ various touch panels capable of detecting a touch or approach of the user and outputting an electric signal corresponding to coordinates of the detected touch point or approaching point.

In some embodiments, the touch screen controller 133 may determine the coordinates of the touch point of the user based on the electric signal output by the touch panel 132, and output the coordinates of the touch point of the user to the controller 120. Furthermore, in some embodiments, the touch screen controller 133 may send the electric signal output by the touch panel 132 to the controller 120 in order for the controller 120 to determine the coordinates of the touch point of the user.

The touch screen controller 133 may include a memory that stores a program and data for controlling operations of the display panel 131 and the touch panel 132, and a microprocessor for performing computations to control operations of the display panel 131 and the touch panel 132 according to the program and data stored in the memory. The memory and processor of the touch screen controller 133 may be provided in separate chips or in a single chip.

In this case where the display 130 corresponds to a touchscreen display, the display 130 may receive a touch input from the user and display an image based on the touch input of the user.

The display 130 may be installed on the door 30 for user convenience. For example, the display 130 may be installed on the second upper door 30ab. Although the display 130 is shown as being installed on the second upper door 30ab in the following description, the installation position of the display 130 is not limited to the second upper door 30ab. For example, the display 130 may be installed anywhere visible to the user, such as on the first upper door 30aa, the first lower door 30b, the second lower door 30c, the outer casing 12 of the main body 10, etc.

The dispenser 160 may discharge water or ice depending on the user input. In other words, the user may directly take out water or ice through the dispenser 160 without opening the door 30.

The dispenser 160 may include a dispenser lever (not shown) for receiving a discharge command from the user, a dispenser nozzle for discharging water or ice, and a dispenser indication panel (not shown) for indicating an operation state of the dispenser 160.

The dispenser 160 may be installed on an outer side of the door 30 or the main body 10. For example, the dispenser 160 may be installed on the first upper door 30aa. Although the dispenser 160 installed on the first upper door 30a will now be described, the dispenser 160 is not limited to being installed on the first upper door 30a but may be installed anywhere that the user is able to take out water or ice, such as the second upper door 30ab, the first lower door 30b, the second lower door 30c, the outer casing 12 of the main body 10, etc.

The cooler 170 may supply cold air into the first storeroom 20. Specifically, the cooler 170 may keep the temperature of the first storeroom 20 within a certain range by using evaporation of refrigerants.

The cooler 170 may include a compressor (not shown) for compressing a gaseous refrigerant, a condenser (not shown) for changing the compressed gaseous refrigerant into a liquid state, an expander (not shown) for depressurizing the liquid refrigerant, and an evaporator (not shown) for changing the depressurized liquid refrigerant into a gaseous state.

The cooler 170 may cool the air in the first storeroom 20 using a phenomenon in which a liquid refrigerant absorbs thermal energy of ambient air while changing from liquid to gaseous state.

For example, the cooler 170 may include a Peltier device using the Peltier effect. The Peltier effect is that a current flowing on a junction between different types of metals causes an exothermic phenomenon at one metal while causing endothermic phenomenon at the other metal. The cooler 170 may cool the air in the first storeroom 20 by using the Peltier device.

In another example, the cooler 170 may include a magnetic cooling device using a magneto-caloric effect. The magneto-caloric effect is to emit heat when a certain material (a magneto-caloric material) is magnetized, and to absorb heat when the certain material is demagnetized. The cooler 170 may cool the air in the first storeroom 20 using the magnetic cooling device.

The communication module 150 may receive a connection command from the user terminal 200 and perform communication with the weight detector 110. Furthermore, the communication module 150 may play a role in providing a remaining amount of an item to the user terminal 200 or the cloud server 300 so that the user terminal 200 or the cloud server 300 sends a purchase request to the external server 400, thereby purchasing the item required.

The communication module 150 may include a local wireless communication module 151, which is capable of wirelessly exchanging data with an external device within a relatively short distance. The local wireless communication module 151 may perform communication based on a communication standard e.g., Wi-Fi, Bluetooth, Zigbee, etc. Furthermore, the communication module 150 may perform wireless communication with a distant server apart from the local wireless communication. Accordingly, the communication module 150 may transmit information about a remaining amount of a content detected by the weight detector 110 directly to the cloud server 300 or the external server 400.

The local wireless communication module 151 may include an antenna that transmits a radio signal to free space or receives a radio signal from the free space, a modulator/demodulator for modulating data for transmission or demodulating a received radio signal, etc.

Figure 5:
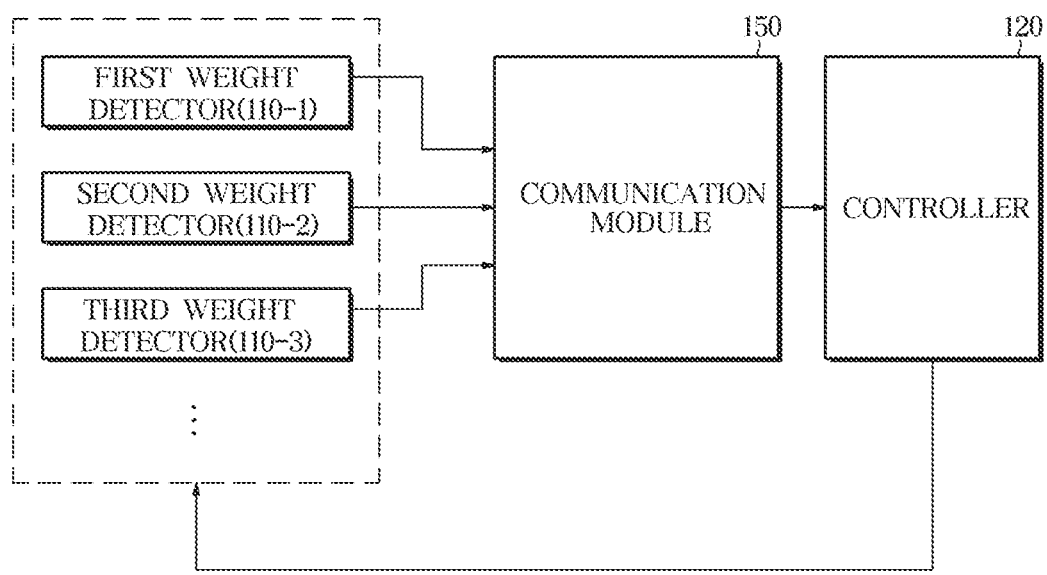
FIG. 5 illustrates connection of a weight detector, according to an embodiment of the disclosure.

FIG. 5 illustrates connection of a weight detector, according to an embodiment of the disclosure.

Referring to FIG. 5, the communication module 150 connected to a plurality of weight detectors 110-1, 110-2 and 110-3 receives weight of a detected item from the plurality of weight detectors 110-1, 110-2 and 110-3 and transmits information about the weight of the item to the controller 120. The controller 120 may determine a remaining amount of the content based on the information about the weight of the item received from the communication module 150 and information about weight of a container received from the user terminal 200.

The storage 140 may include a non-volatile memory that stores a program or power and preserves the stored program or data even when the power is out. For example, the storage 140 may include a bulk flash memory, a solid state drive (SSD) 141, or the like.

The storage 140 may store a control program and control data for controlling operations of the refrigerator 100 and store various application programs and application data for performing various functions in response to inputs from the user.

For example, the storage 140 may store an operating system (OS) program that manages components and resources (in software and hardware) included in the refrigerator 100, an online shopping application allowing the purchase of a product online, an application that may work with an application installed in the user terminal 200, etc.

The controller 120 may include a memory 122 for storing a program and data for controlling operations of the refrigerator 100, and a processor 121 for generating control signals to control the operations of the refrigerator 100 according to the program and data stored in the memory 122.

Specifically, the controller 120 may determine a remaining amount of a content based on information about the weight of an item and information about the item input by the user, when the communication module 150 connected to the weight detector 110 provides the information about the weight of the item.

The memory 122 may temporarily store touch input data of the user input through the display 130 and data stored in the storage 140. For example, the memory 122 may store a screen and/or an image to be displayed on the touch screen display 130, a control command corresponding to the touch input of the user and coordinates of the touch input of the user through the touch screen display (i.e., display 130).

The memory 122 may include a volatile memory for temporarily storing data, such as a static random access memory (SRAM), a dynamic random access memory (DRAM), or the like. The memory 122 may also include a non-volatile memory for storing data for a long time, such as a read-only memory (ROM), an erasable programmable ROM (EPROM), an electrically erasable programmable ROM (EEPROM), etc.

The processor 121 and the memory 122 may be implemented in separate chips or in a single chip.

As such, the controller 120 may control operations of the refrigerator 100 according to a user input received through the display 130 and/or the program and data stored in the storage 140. Operations of the refrigerator 100 as will be described below may be performed under the control of the controller 120.

The weight detector 110, the controller 120, the display 130, the storage 140, the communication module 150, the dispenser 160 and the cooler 170 included in the refrigerator 100 have thus far been described, but a new component may be added thereto or some of the aforementioned components may be omitted as required.

Figure 6:
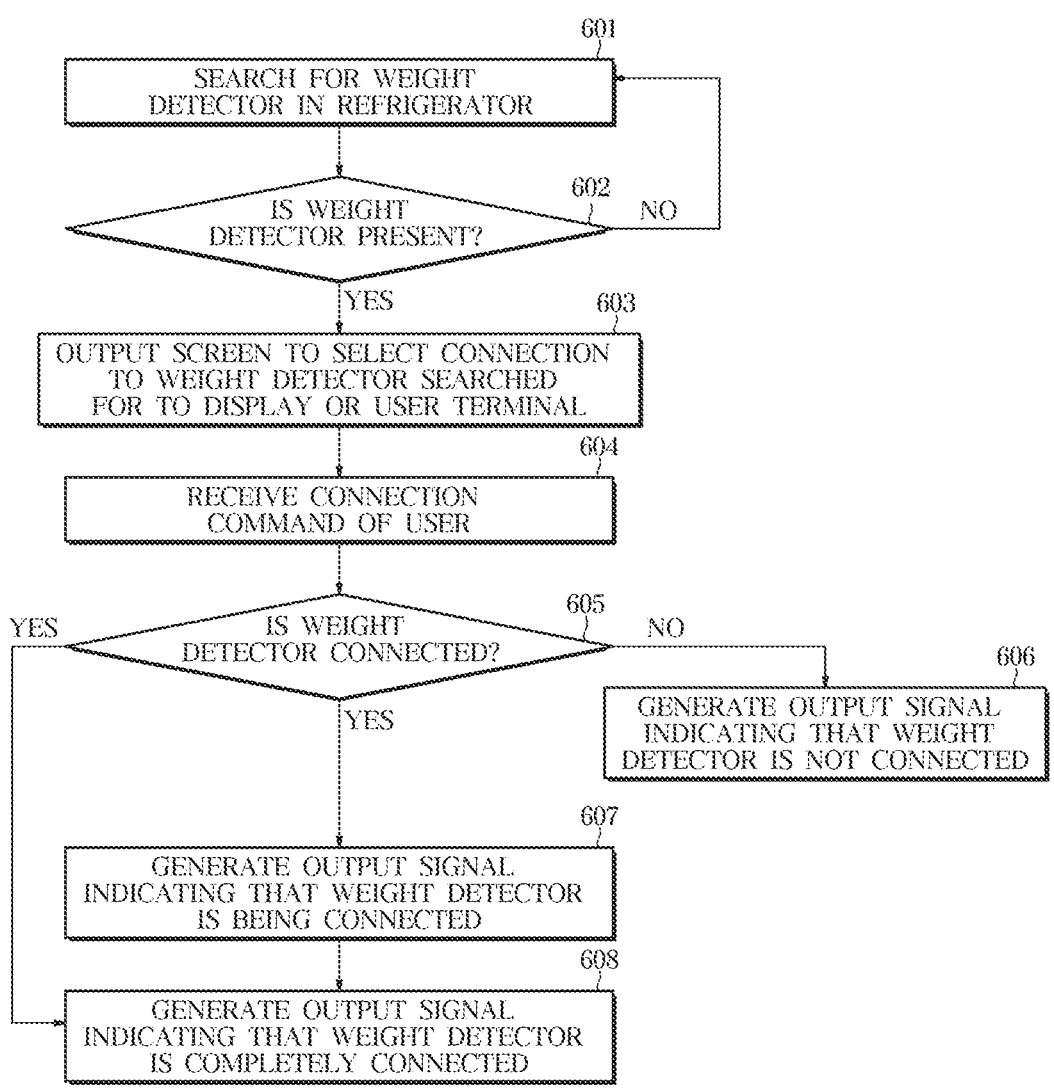
FIG. 6 is a flowchart of a method of controlling a refrigerator, according to an embodiment of the disclosure.

FIG. 6 is a flowchart of a method of controlling a refrigerator, according to an embodiment of the disclosure.

Figure 7:
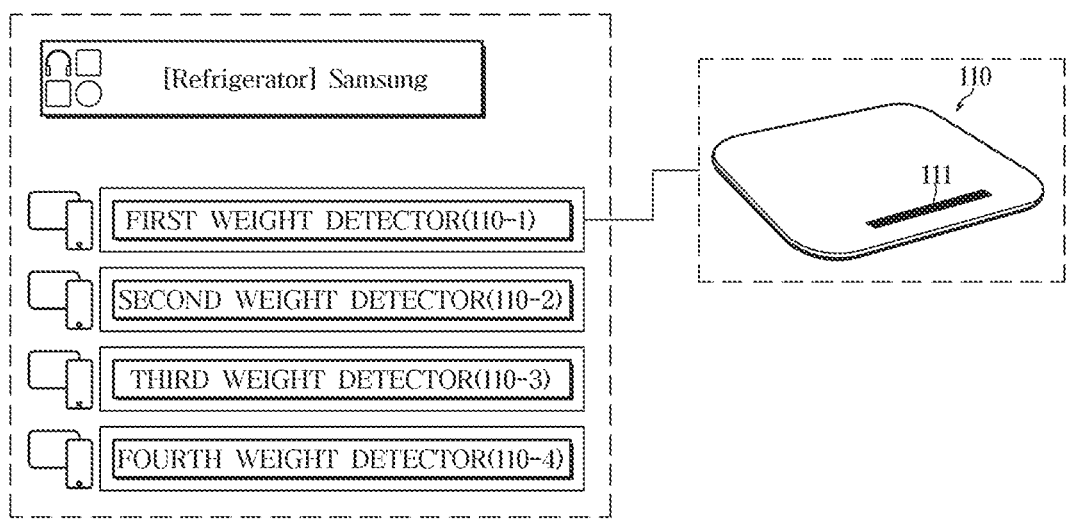
FIGS. 7 and 8 are diagrams for describing output signals identifying connection states of a weight connector according to various embodiments of the disclosure.
Figure 8:
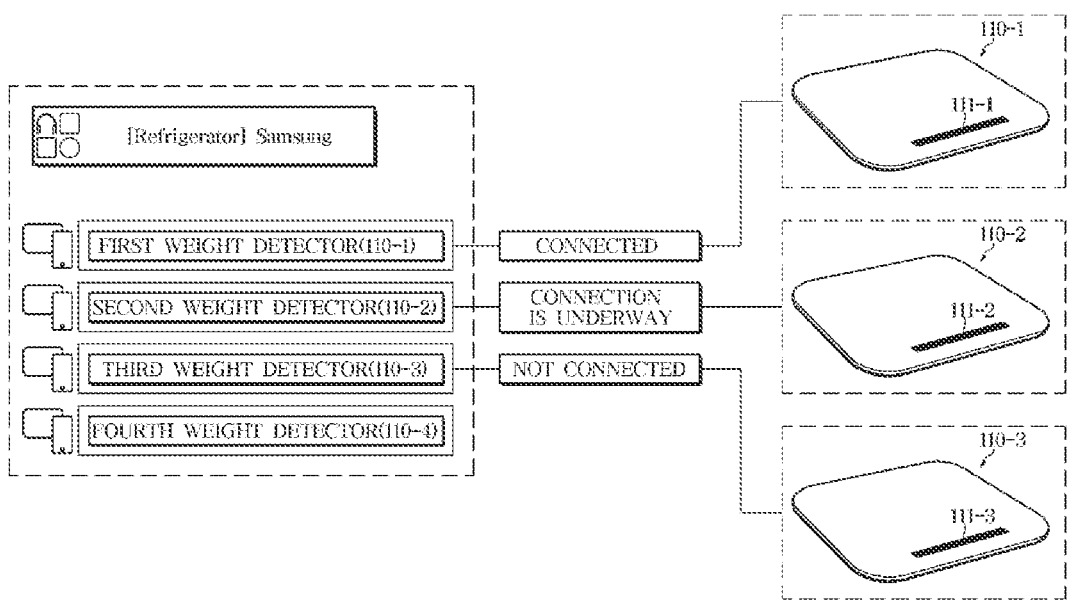

FIGS. 7 and 8 are diagrams for describing output signals identifying connection states of a weight connector according to various embodiments of the disclosure.

These are merely desirable embodiments to attain the goal of the disclosure, but it is, of course, possible that some operations may be added thereto or omitted therefrom.

Referring to FIG. 6, the controller 120 searches for the weight detector 110 in the refrigerator 100 through the communication module 150 capable of performing communication with the weight detector 110, in operation 601. In this case, the communication module 150 detects the weight detector 110 through short-range wireless communication such as Bluetooth when the user places the weight detector 110 in the refrigerator 100.

When the weight detector 110 is present in the refrigerator 100 in operation 602, the controller 120 outputs a screen to select connection to the weight detector 110 searched for to the display 130 or the user terminal 200, in operation 603. FIG. 7 illustrates an example of a screen displayed on the display 130 or the user terminal 200. For example, the display 130 or the user terminal 200 may display search results of the plurality of weight detectors 110-1, 110-2, 110-3 and 110-4 on a screen, and receive a connection command for at least one of the plurality of weight detectors 110-1, 110-2, 110-3 and 110-4 from the user.

The controller 120 may receive the connection command of the user, in operation 604. In this case, the connection command of the user may be input through the display 130 or the user terminal 200.

When the weight detector 110 is connected to the communication module 150 in operation 605, the controller 120 may generate an output signal to identify a connection state between the weight detector 110 and the communication module 150 based on the connection state. The output signal may also be output in other various methods through the indicator 111 equipped in the weight detector 110.

When no connection command is received from the user through the display 130 or the user terminal 200, the controller 120 may generate an output signal to indicate that connection to the weight detector 110 is not made, in operation 606.

When connection between the weight detector 110 and the communication module 150 are underway after a connection command is received through the display 130 or the user terminal 200, the controller 120 may generate an output signal to indicate that connection to the weight detector 110 is underway, in operation 607.

Furthermore, when connection between the weight detector 110 and the communication module 150 by a connection command of the user is completed, the controller 120 may generate an output signal to indicate that connection to the weight detector is completed in operation 608.

FIG. 8 illustrates indications of a weight detector based on output signals generated by a controller according to an embodiment of the disclosure.

Referring to FIG. 8, the first weight detector 110-1, which has been connected according to a connection command of the user, outputs green light, the second weight detector 110-2, which is being connected, outputs yellow light, and the third weight detector 110-3, which is not connected, outputs red light. This may allow the user to check the output signal indicated on the weight detector 110 and places an item, for which the user wants to know the remaining amount in real time, on the weight detector 110. However, FIG. 8 is merely an example, and the indicator 111 may identify a connection state through other indication devices apart from the LEDs. The indicator 111 includes the indicators 111-1, 111-2, 111-3 associated respectively with weight detectors 110-1, 110-2 and 110-3.

In addition to the controlling method referring to FIG. 6, when the weight detector 110 is connected to the communication module 150, the controller 120 may issue an ID to the weight detector 110 to which connection is completed. By issuing the ID to the weight detector 110, the controller 120 may distinguish the weight detector 110 from other weight detectors on a screen of the user terminal 200 or the display 130. Furthermore, the controller 120 may control information about an output signal corresponding to the ID to be output so that the user may check from the outside of the refrigerator 100 whether the weight detector 110 is connected. Moreover, when IDs are issued by the controller 120 to the plurality of weight detectors, respectively, the user may prioritize the plurality of weight detectors on the user terminal 200 or the display 130 to make it easy for management.

In connection with FIGS. 6 to 8, a method of controlling displaying of connection procedures and connection states between the refrigerator 100 and the weight detector 110 has been described. Methods for figuring out a remaining amount of a content using the connected weight detector 110 and then managing the item will now be described in detail.

Figure 9:
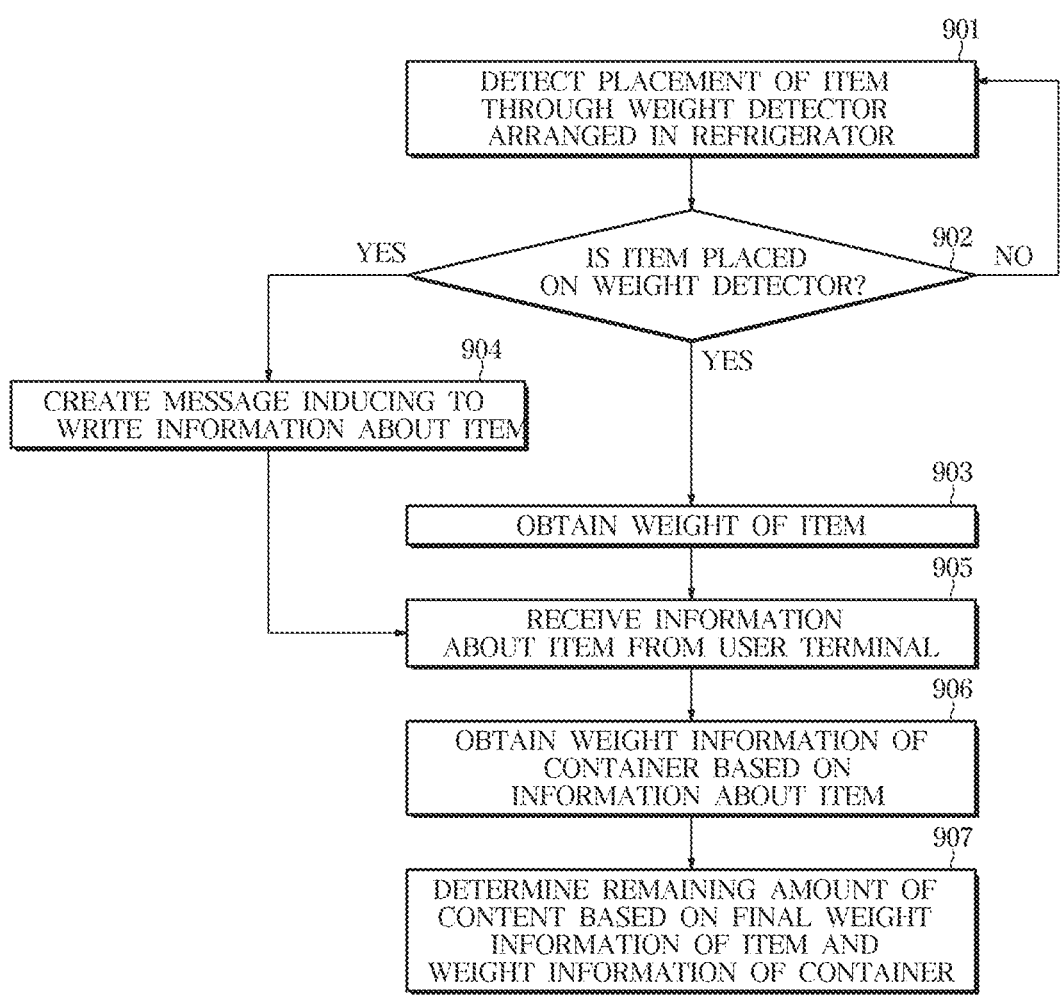
FIG. 9 is a flowchart of a method of controlling a refrigerator, according to an embodiment of the disclosure.

FIG. 9 is a flowchart of a method of controlling a refrigerator, according to an embodiment of the disclosure.

These are merely desirable embodiments to attain the goal of the disclosure, but it is, of course, possible that some operations may be added thereto or omitted therefrom.

Referring to FIG. 9, the controller 120 detects placement of an item through the weight detector 110 arranged in the refrigerator 100, in operation 901. The user may place the item on the weight detector 110 arranged in the first storeroom 20 or the second storeroom 25 of the refrigerator 100, and upon detection of the placement of the item on the weight detector 110 in operation 902, the controller 120 may obtain weight of the item in operation 903.

When the controller 120 detects the placement of the item on the weight detector 110 in operation 902, the controller 120 creates a message inducing the user to write information about the item through the user terminal 200 or the display 130, in operation 904.

The message generated in operation 904 may employ various methods. For example, the message may be a notification message displayed with e.g., an icon in a portion of a screen of the user terminal 200 or the display 130, a push message or an in-app message displayed based on inactivation or activation of a corresponding application in the user terminal 200.

The user may run the corresponding application through the message once the message is created, or in person, to input information about the item. For example, the user may select a name of the item from a preset list in the corresponding application, and the application may provide weight information of a container of the item corresponding to the selected name of the item. Furthermore, the user terminal 200 may transmit the name of the item input by the user in person to the cloud server 300 to obtain the weight information of the container of the item. In this case, the cloud server 300 may provide the weight information of the container.

In addition to the user selecting the name of the item for the information about the item, the user may execute a camera function equipped in the user terminal 200 to input the information about the item in an image processing method for the image of the item. For example, the user may automatically or manually execute the camera function linked to the corresponding application to obtain an image of the item. For example, when a push message is performed, the user terminal 200 may automatically execute the camera function in response to a touch input of the user in the push message area. Information about the item may be obtained through a barcode recognition function or a quick response (QR) code recognition function, in addition to performing image processing on the image itself Upon reception of the information about the item from the user terminal 200 in the aforementioned method in operation 905, the controller 120 obtains weight information of the container based on the information about the item in operating 906. In this case, the weight information of the container may be data stored for each item, or data calculated based on a material and volume of the container.

The controller 120 determines a remaining amount of the content based on final weight information of the item and the weight information of the container, in operation 907. The final weight information corresponds to final weight information among pieces of weight information of the item obtained by the weight detector 110 in real time. Accordingly, the controller 120 may determine an accurate remaining amount of the content by reflecting the weight information of the container in the weight of the item itself FIG. 11 illustrates information of items output through a display or a user terminal according to an embodiment of the disclosure.

In the meantime, the controller 120 may provide information about the remaining amount of the content to the user through the user terminal 200 or the display 130.

Figure 11:
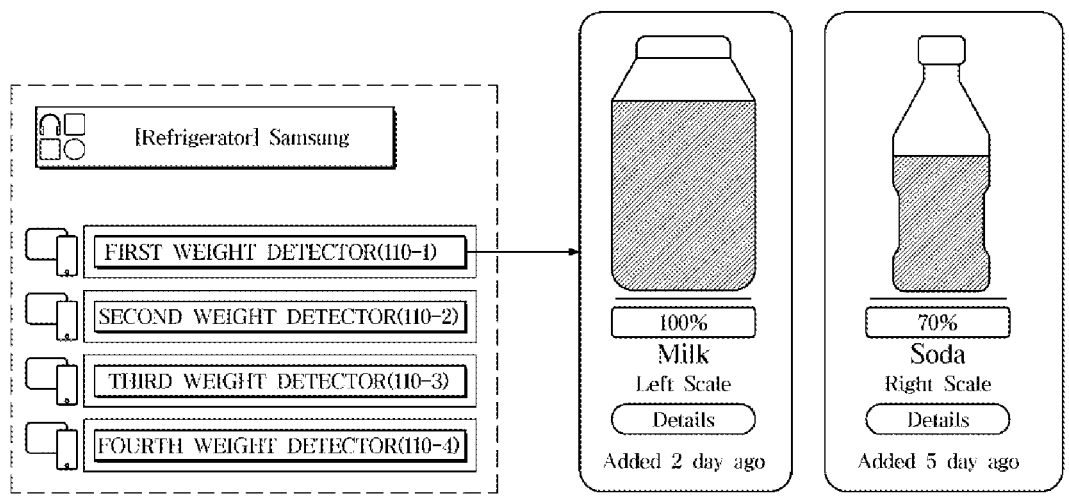
FIG. 11 illustrates information of items output through a display or a user terminal according to an embodiment of the disclosure.

Referring to FIG. 11, the user terminal 200 or the display 130 may display information about the remaining amount of the content in percentage or volume (not shown) along with the name of the item placed on the first weight detector 110-1.

The controller 120 may perform an additional operation based on determination of the remaining amount of the content as follows.

In an embodiment, the controller 120 may create a purchase recommendation message or automatic purchase command for the item for the user terminal 200, when the remaining amount of the content is equal to or less than a preset amount. The preset amount may be set by the user through a corresponding application. For example, when a repurchase condition of milk is met when there is 10% or 100 ml or less of the milk, the user terminal 200 may create a command to recommend the user to purchase milk or to perform automatic purchase of the milk.

Furthermore, in another embodiment, when there is no change in remaining amount of the content for a preset period of time, the controller 120 may create a notification to be identified by the user terminal 200 or the display 130. The embodiment may be applied to a case where the item placed on the weight detector 110 is a food required to be eaten at regular intervals (e.g., an internal medicine in a fluid type). Furthermore, when there is no consumption of the remaining amount of the content that exceeds a preset amount for a preset period of time, the controller 120 may create a notification to be identified by the user terminal 200 or the display 130.

Figure 10:
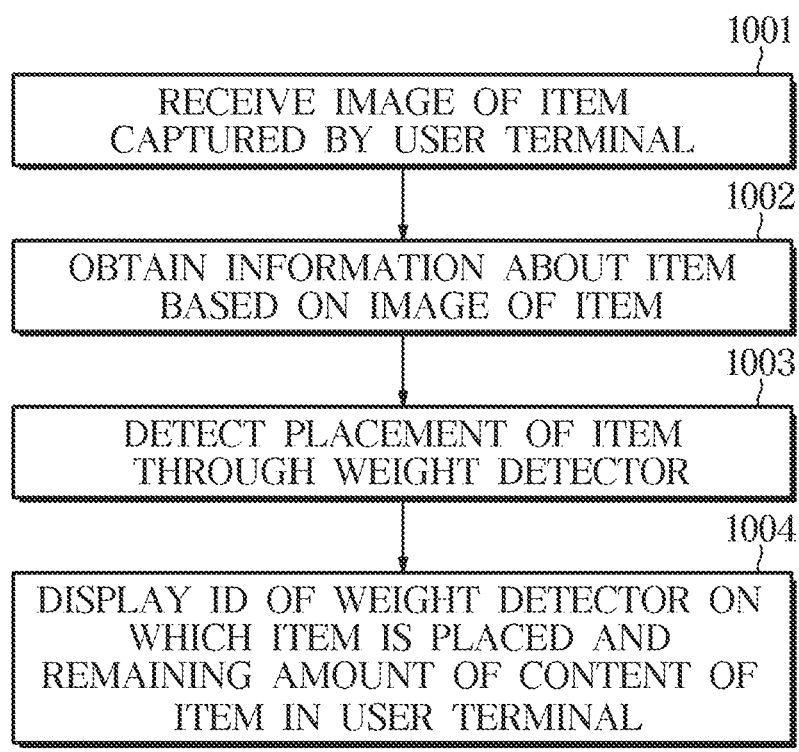
FIG. 10 is a flowchart of a method of controlling a refrigerator, according to an embodiment of the disclosure.

FIG. 10 is a flowchart of a method of controlling a refrigerator, according to an embodiment of the disclosure.

These are merely desirable embodiments to attain the goal of the disclosure, but it is, of course, possible that some operations may be added thereto or omitted therefrom.

Unlike the embodiment of FIG. 9, this embodiment is directed to a method in which the user inputs information about an item to the user terminal 200 or the display 130 before placing the item on the weight detector 110.

Referring to FIG. 10, first, the controller receives an image of an item captured by the user terminal 200 in operation 1001, and obtains information about the item based on the image of the item in operation 1002. In this case, the user terminal 200 may obtain a name of the item and weight information of a container of the item to be output on a screen based on the image of the item.

The controller 120 detects placement of the item through the weight detector 110 in operation 1003, and displays an ID of the weight detector 110 on which the item is placed and a remaining amount of the content on the user terminal 200 in response to the detecting in operation 1004. As shown in FIG. 11, the remaining amount of the content may be displayed along with the name of the item.

Meanwhile, the embodiments of the disclosure may be implemented in the form of a recording medium for storing instructions to be carried out by a computer. The instructions may be stored in the form of program codes, and when executed by a processor, may generate program modules to perform operation in the embodiments of the disclosure. The recording media may correspond to computer-readable recording media.

The computer-readable recording medium includes any type of recording medium having data stored thereon that may be thereafter read by a computer. For example, it may be a read only memory (ROM), a random access memory (RAM), a magnetic tape, a magnetic disk, a flash memory, an optical data storage device, etc.

The recording medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., play Store™), directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A refrigerator comprising:
a main body including a first storeroom;
a door coupled to the main body to one of open or close the first storeroom and equipped with a second storeroom apart from the first storeroom;
a weight detector arranged in at least one of the first storeroom or the second storeroom for detecting weight of an item stored in the at least one of the first storeroom or the second storeroom;
a communication circuit configured to perform communication with the weight detector; and
a controller configured to generate an output signal based on a connection state of the communication between the weight detector and the communication circuit, the output signal identifying the connection state of the communication,
wherein the weight detector comprises an indicator on which the output signal is indicated,
wherein the controller is further configured to control the output signal to be output through the indicator, and
wherein the controller is further configured to control the indicator to output a first mode in response to the weight detector not connected to the communication circuit, a second mode in response to the weight detector being connected to the communication circuit, and a third mode in response to the weight detector connected to the communication circuit.

2. The refrigerator of claim 1, further comprising:
a display arranged in at least a portion of the door and displaying a screen to select a connection between the weight detector and the communication circuit, and the output signal, wherein the controller is further configured to generate the output signal based on receiving a connection command from a user.

3. The refrigerator of claim 1, wherein the controller is further configured to:
control a screen to select a connection between the weight detector and the communication circuit to be output to a user terminal; and
generate the output signal based on receiving a connection command from a user through the user terminal.

4. The refrigerator of claim 3, wherein the controller is further configured to:
issue an identity (ID) to the weight detector in response to the weight detector connected to the communication circuit; and
control the ID and information about an output signal corresponding to the ID to be output to the user terminal.

5. A refrigerator comprising:
a main body including a first storeroom;
a door coupled to the main body to open or close the first storeroom and equipped with a second storeroom apart from the first storeroom;
a weight detector arranged in at least one of the first storeroom or the second storeroom for detecting weight of an item;
a communication circuit configured to perform communication with the weight detector, and
a controller configured to determine a remaining amount of content included in the item through the weight detector,
wherein the weight detector comprises an indicator on which an output signal is indicated;
wherein the controller is further configured to control the output signal to be output through the indicator, and
wherein the controller is further configured to control the indicator to output a first mode in response to the weight detector not connected to the communication circuit, a second mode in response to the weight detector being connected to the communication circuit, and a third mode in response to the weight detector connected to the communication circuit.

6. The refrigerator of claim 5, further comprising:
a communication circuit configured to perform communication with a user terminal with which to transmit or receive information about the item,
wherein the controller is configured to:
obtain weight of a container storing the content, and determine a remaining amount of the content based on a final weight of the item and the weight of the container, in response to receiving the information about the item.

7. The refrigerator of claim 6, wherein the controller is further configured to control the communication circuit to transmit information about the remaining amount of the content to the user terminal.

8. The refrigerator of claim 6, wherein the controller is further configured to control the communication circuit to transmit a message recommending purchase of the item or a command for automatic purchase of the item to the user terminal in response to the remaining amount of the content being equal to or less than a preset amount.

9. The refrigerator of claim 6, wherein the controller is further configured to control the communication circuit to transmit a message inducing to write information about the item to the user terminal in response to the weight detector detecting that the item is placed.

10. The refrigerator of claim 9, wherein the message comprises at least one of a notification message, a push message, or an in-app message.

11. The refrigerator of claim 6, wherein the controller is further configured to control the communication circuit to transmit a command to execute a camera function for capturing an image of the item to the user terminal in response to the weight detector detecting that the item is placed.

12. The refrigerator of claim 6, wherein the controller is further configured to:
obtain information about the item based on an image of the item captured by the user terminal, and
control the communication circuit to transmit an identity (ID) of the weight detector and a remaining amount of content of the item to the user terminal in response to the weight detector detecting that the item is placed.

13. A computer program including instructions stored on a non-transitory recording medium, which when executed by a computing device, perform a method of obtaining weight information of a container, the method comprising:
detecting placement of an item through a weight detector arranged in a refrigerator and obtaining weight of the item;
performing communication with the weight detector via a communication circuit;
receiving information about the item from a user terminal;
obtaining the weight information of the container storing a content based on the information about the item, and determining a remaining amount of the content based on a final weight of the item and the weight information of the container;
generating an output signal corresponding to a connection state between the weight detector and the communication circuit;
outputting the output signal through an indicator included in the weight detector; and
controlling the indicator to display a first mode when the weight detector is not connected, a second mode when the weight detector is connected, and a third mode indicating that active communication is being performed.

* * * * *